(12) United States Patent
Saks (10) Patent No.: US 8,485,877 B2
(45) Date of Patent: Jul. 16, 2013

(54) METHOD AND SYSTEM FOR A MIXED MARTIAL ARTS FANTASY GAME

(75) Inventor: Jeremy Robert Saks, New York, NY (US)

(73) Assignee: Finishers LLC, New York, NY (US)

( * ) Notice: Subject to any disclaimer, the term of this patent is extended or adjusted under 35 U.S.C. 154(b) by 15 days.

(21) Appl. No.: 13/239,372

(22) Filed: Sep. 21, 2011

(65) Prior Publication Data

US 2013/0072305 A1    Mar. 21, 2013

(51) Int. Cl.
*A63F 13/10* (2006.01)
(52) U.S. Cl.
USPC ............................................................. 463/4
(58) Field of Classification Search
USPC .................................. 463/40–43, 4
See application file for complete search history.

(56) References Cited

U.S. PATENT DOCUMENTS

| | | | |
|---|---|---|---|
| 4,918,603 A | 4/1990 | Hughes et al. |
| 5,263,723 A | 11/1993 | Pearson et al. |
| 5,713,793 A | 2/1998 | Holte |
| 5,860,862 A | 1/1999 | Junkin |
| 6,004,206 A | 12/1999 | Fabri |
| 6,007,426 A | 12/1999 | Kelly et al. |
| 6,120,376 A | 9/2000 | Cherry |
| 6,135,881 A | 10/2000 | Abbott et al. |
| 6,371,855 B1 | 4/2002 | Gavriloff |
| 6,669,565 B2 | 12/2003 | Liegey |
| 7,001,279 B1 | 2/2006 | Barber et al. |
| 7,303,472 B2 | 12/2007 | Guagliardo |
| 7,351,150 B2 | 4/2008 | Sanchez |
| 7,364,509 B2 | 4/2008 | Slade |
| 7,699,707 B2 | 4/2010 | Bahou |
| 7,736,219 B2 | 6/2010 | Gottlieb |
| 7,762,878 B2 | 7/2010 | Nicholas et al. |
| 2002/0107590 A1 | 8/2002 | Liegey |
| 2004/0110552 A1 | 6/2004 | Del Prado |
| 2004/0266530 A1 | 12/2004 | Bishop |
| 2005/0064937 A1 | 3/2005 | Ballman |
| 2005/0164792 A1 | 7/2005 | Wilcock |
| 2006/0025208 A1 | 2/2006 | Ramsey |
| 2006/0040719 A1 | 2/2006 | Plimi |
| 2006/0217198 A1 | 9/2006 | Johnson |
| 2007/0021853 A1 | 1/2007 | Ma et al. |
| 2008/0268951 A1 | 10/2008 | Gropp et al. |
| 2009/0156311 A1 | 6/2009 | Ng et al. |
| 2010/0184495 A1 | 7/2010 | Levy et al. |
| 2010/0203935 A1 | 8/2010 | Levy et al. |
| 2010/0203936 A1 | 8/2010 | Levy et al. |
| 2010/0279754 A1 | 11/2010 | Tanenbaum |
| 2010/0311484 A1 | 12/2010 | Suh et al. |

*Primary Examiner* — Omkar Deodhar (57) ABSTRACT

This invention provides a method and system for administering and playing a mixed martial arts fantasy sports game. The game is based on the statistical performance of mixed martial artists fighting in real-world sporting events. Game play occurs by means of a database configuration supporting an electronic listing of fighter information, fantasy game player and team information, and fantasy game scoring information, as well as one or more electronic user interfaces for game participation and fantasy team selection. The game proceeds by selecting a team of mixed martial arts fighters whose fights are predicted to end prior to a judge's decision. The game is scored based on the speed of the fights of each of the winning fighters on each team, where the shorter the fight duration, the greater the scoring value to the team, and, in certain embodiments, is also scored based on the manner of the conclusion of the fights.

14 Claims, 5 Drawing Sheets

METHOD AND SYSTEM FOR A MIXED MARTIAL ARTS FANTASY GAME

CROSS-REFERENCE TO RELATED APPLICATIONS

None

BACKGROUND OF THE INVENTION

The following is a table of certain prior art that presently appears relevant.

U.S. Patents

| Pat. No. | Patent Date | Patentee | Kind Code |
|---|---|---|---|
| 5,713,793 | Feb. 03, 1998 | Holte | |
| 6,004,206 | Dec. 21, 1999 | Fabri | |
| 6,007,426 | Dec. 28, 1999 | Kelly et al. | |
| 6,135,881 | Oct. 24, 2000 | Abbott et al. | |
| 6,371,855 | Apr. 16, 2002 | Gavriloff | B1 |
| 6,669,565 | Dec. 30, 2003 | Liegey | B2 |
| 7,001,279 | Feb. 21, 2006 | Barber et al. | B1 |
| 7,303,472 | Dec. 04, 2007 | Guagliardo | B2 |
| 7,351,150 | Apr. 01, 2008 | Sanchez | B2 |
| 7,364,509 | Apr. 29, 2008 | Slade | B2 |
| 7,699,707 | Apr. 20, 2010 | Bahou | B2 |
| 7,736,219 | Jun. 15, 2010 | Gottlieb | B2 |
| 7,762,878 | Jul. 27, 2010 | Nicholas et al. | B2 |

U.S. Patent Application Publications

| Pub. No. | Pub. Date | Applicant | Kind Code |
|---|---|---|---|
| 20020107590 | Aug. 08, 2002 | Liegey | A1 |
| 20040110552 | Jun. 10, 2004 | Del Prado | A1 |
| 20040266530 | Dec. 30, 2004 | Bishop | A1 |
| 20050064937 | Mar. 24, 2005 | Ballman | A1 |
| 20050164792 | Jul. 28, 2005 | Wilcock | A1 |
| 20060025208 | Feb. 02, 2006 | Ramsey | A1 |
| 20060040719 | Feb. 23, 2006 | Plimi | A1 |
| 20060217198 | Sep. 28, 2006 | Johnson | A1 |
| 20090156311 | Jun. 18, 2009 | Ng et al. | A1 |
| 20100184495 | Jul. 22, 2010 | Levy et al. | A1 |
| 20100203935 | Aug. 12, 2010 | Levy et al. | A1 |
| 20100203936 | Aug. 12, 2010 | Levy et al. | A1 |

1. Field of the Invention

The present invention relates to a fantasy sports game, and in particular, to a method and system for administering and playing a mixed martial arts fantasy sports game. The game is based on the statistical performance of mixed martial artists fighting in real-world sporting events. Embodiments of the invention are suitable for a wide array of applications, including a multi-player, web-based fantasy mixed martial arts game based on a group of fights from a single mixed martial arts event.

2. Description of the Prior Art

Fantasy sports games are skill games predicated on tracking the statistical performance of athletes in real-world sporting events. In a typical fantasy sports game, each game player selects a group of athletes from a particular sport to constitute his or her fantasy team. Two or more teams then compete against one another, with teams accumulating points based on the statistical performance of their rosters of athletes in multiple real-world contests. The statistics of the athletes are measured and compiled across a series of categories, and teams are awarded points for performance in each category. The team whose roster of athletes compiles the most points in a given time frame wins the game.

Millions of fans participate in fantasy leagues organized around various sports, including "fantasy baseball," "fantasy football," "fantasy basketball" and others. Today, fantasy sports are most often played on the world wide web via personal computers, but they may also be played by participants in person, or through electronic devices such as mobile phones, personal digital assistants and video game consoles.

Game providers procure and compile the sports performance statistics that enable game play. The statistics may be obtained by the fantasy game provider directly, by observing the performances and tallying the attributes, or else by third party statisticians at a cost. In either case, the statistics are obtained either by attending live events or by viewing the events on television or the internet.

Mixed martial arts (or "MMA") is a hybrid combat sport that combines elements of traditional martial arts disciplines into a single fighting system. MMA can be practiced recreationally for fitness and self-defense, or viewed as a spectator sport. Professional MMA prize fighting is a popular attraction, with events hosted by top fight promotions such as the Ultimate Fighting Championship (the "UFC") broadcast internationally to large audiences.

In MMA prize fights, two combatants are pitted against one another in a ring, cage or other enclosure, and fight under a set of governing rules. The fighters utilize various striking techniques, including kicks, punches and knees, as well as grappling holds such as joint locks and chokes. Most MMA fights end in one of three ways: by knockout ("KO"); by "submission" ("SUB"), in which a combatant is forced to concede; or, if the allotted time runs out, via a judges' decision ("DEC"). A typical MMA fight card can involve anywhere from five to fifteen or more separate bouts. Each fight's outcome is independent of the other fights on the card.

Mixed martial arts bouts in the United States are generally regulated and sanctioned by the state athletic commission or equivalent entity of the state in which the fights take place. Sanctioned MMA events include referees, ringside judges and doctors, weight divisions, set rounds of action, fixed time limits, protective gloves and other protective gear, predefined scoring, and a predefined set of fouls. Fight outcomes are not scripted or predetermined.

As evidenced in the prior art, typical MMA fantasy games require each player to select a roster of fighters for his or her team and then receive points throughout a fantasy season which may last for many months or longer, and in some cases lasts indefinitely.

The statistical categories for fantasy MMA games typically include some combination of: the number of strikes attempted or landed against an opponent; the percentage of strikes landed; the type of strikes attempted or landed, such as a kick versus a punch; the number of "power" or impact shots landed; the number of grappling moves, such as a takedown or a joint lock, attempted or successfully landed; the number of successful reversals of an advantageous position; successfully knocking out or submitting an opponent; and winning a fight. MMA games and entertainment based predominantly on correctly selecting the winners of fights, including fixed-odds wagering games, are not typically categorized as fantasy games because they do not emphasize the statistical performance of athletes in multiple categories and across multiple contests.

As a number of the embodiments described herein will demonstrate, there are important disadvantages in the prior art for playing an MMA fantasy game. These disadvantages make fantasy MMA games less fun and engaging for players to participate in:

(a) MMA fantasy leagues suffer by taking place over extended periods, because unlike some other major sports, there may be no significant or high-profile MMA events held for weeks or months at a time. During this time fantasy players may become disinterested, and the excitement of the game as a whole is diminished.

(b) MMA fantasy game play suffers when organized into fantasy seasons because the sport of MMA is generally not organized by season. The number of MMA events in any given time frame can be inconsistent, making long-term fantasy game play more confusing and less engaging.

(c) Fighters on a fantasy MMA team will often fail to fight within a given time period because of a high rate of injury among the fighters, as well as the relative infrequency with which some top fighters compete. This, too, reduces fantasy player engagement and enjoyment.

(d) MMA fantasy game play suffers because some of the statistical categories utilized for game play, such as certain grappling maneuvers, are difficult for novice MMA fans to grasp and identify. This makes fantasy MMA games more difficult to learn and play.

There are also a number of disadvantages with the related art for administering an MMA fantasy game, as a number of the embodiments described herein will show. These disadvantages make it more difficult for game providers to maintain the game, while also making such games less fun, less transparent and less reliable for players to participate in:

(a) The statistical categories utilized in the prior art are difficult for game providers and statisticians to capture because a high number of kicks, punches and other techniques can be performed within a matter of seconds, and with varying rates of success. This results in errors and omissions in gathering the statistical record.

(b) The statistics are difficult for game providers and statisticians to tabulate and report in a timely fashion, because so many techniques are utilized that conveying them results in a time lag that hinders timely or "real time" fantasy game tracking.

(c) The statistics are imprecise and susceptible to interpretation, for example, when measuring a "power" strike versus a "non-power" strike, or the degree of success of a grappling maneuver.

(d) The statistics fail, from time to time, to capture the real-world performance of the fighters, by rewarding fighters who utilize a greater range or frequency of fighting techniques even when such techniques are not utilized effectively.

Patents have issued previously based on methods and systems for organizing fantasy game play based on combat sport entertainment.

U.S. Pat. No. 7,303,472 issued to A. Guagliardo ("Interactive Professional Wrestling Fantasy Contest System") describes a fantasy game play system for use with televised professional wrestling shows. For many reasons, the method in U.S. Pat. No. 7,303,472 is completely limited to use in professional wrestling, and details a system of scoring specific to professional wrestling, including theatrical or non-sporting elements such as "speak[ing] on a television microphone" and "strik[ing] a person of authority [such] as a referee, announcer or promoter."

U.S. Pat. No. 7,736,219 issued to D. Gottlieb ("Method of Playing An Interactive Fantasy Boxing League Game") describes a method of playing a fantasy boxing game. The method in U.S. Pat. No. 7,736,219 is completely limited to use in boxing contests for many reasons, including that MMA and MMA-specific statistical categories are not mentioned or contemplated, and that statistical categories such as "Divisional Ranking" and "Alphabet Belts" referenced in the method do not apply to MMA.

SUMMARY OF THE INVENTION

Embodiments of the invention are directed to a method and system for administering and playing a fantasy mixed martial arts game that substantially obviates one or more disadvantages of the prior art:

(a) One object of embodiments of the invention is to enable MMA fantasy game play that is easy for game players to learn and play.

(b) Another object of embodiments of the invention is to enable an MMA fantasy game to be played more easily based upon a single MMA event (the event itself being comprised of multiple bouts).

(c) Another object of embodiments of the invention is to enable an MMA fantasy game that is fun, exciting, engaging and transparent to observe and participate in at the same time that an MMA event is taking place or very shortly thereafter.

(d) Another object of embodiments of the invention is to reduce the amount of statistical data MMA fantasy game providers and statisticians need to capture to support game play, and to allow them to tabulate and report relevant statistical data for game play quickly, simply and with limited error.

(e) Another object of embodiments of the invention is to enable an MMA fantasy game to be based upon statistical categories that are not susceptible to subjective interpretation by game providers and statisticians.

(f) Another object of embodiments of the invention is to enable MMA fantasy game play that is aligned with the real-world performance of the fighters.

Additional features and advantages of embodiments of the invention will be set forth in the description, appended drawings and claims which follow, and in part will be apparent from them, or may be learned by practice of embodiments of the invention.

To achieve these and other advantages through various embodiments, the method and system for administering and playing an MMA fantasy game is comprised of a scoring methodology whereby, among other game criteria, game play is based upon each player's skill in selecting a fantasy team of MMA fighters from one or more upcoming or concurrent events who will win their respective fights the fastest, preferably before such fights reach a judges' decision. Players will assemble teams of fighters that accumulate points (or other units of value as defined in the embodiment) based upon the correctly selected fights which end prior to a judge's decision, the speed of such fights, and, in certain embodiments, the manner of the conclusion of such fights.

In particular, in one exemplary embodiment, of which many others are possible, a game player might login to a hosted online game application before an MMA event begins, and join a particular instance of the game. The game in the embodiment would be open to any group of players wishing to join, though other embodiments might operate through private invitation or be open to only a single player. Each game player would, in this embodiment, join and assemble his or her fantasy team independently, absent a live "fantasy draft" during which all of the game players need to be available and playing at the same time.

The game player would select a limited number of fighters from an overall group of fighters scheduled to compete in an upcoming event, based upon the game player's belief as to which fighters will win their fights the fastest. In this exemplary embodiment, this could entail the game player selecting a total of nine fighters from a total pool of twenty four fighters scheduled to compete in a particular MMA event.

The game player would rank his or her selection of fighters by subdividing them into multiple groups or "tiers," with the first tier representing the sub-group of fighters the game player believes is most likely to win their respective fights the fastest, the second tier representing the sub-group of fighters the game player believes is second-most likely to win their respective fights the fastest, and so on for all of the fighters constituting the game player's roster and all of the tiers provided in the embodiment. In this exemplary embodiment, this could entail the player subdividing his or her roster of nine fighters into three tiers of three fighters, with the first tier considered most likely to finish their fights the fastest, the second tier considered the second most likely, and the third tier the third most likely.

The player of this embodiment would select the technique by which each of his or her roster of fighters will win the fight prior to a decision, for example, via knockout or via submission.

The player of this embodiment would be permitted to select either or both of any two fighters scheduled to fight one another in a particular bout, which is to say, a player would not need to predict one and only one fight winner for any or all of the given fights, or to predict a fight winner for every fight.

The process of selecting fighters, grouping fighters and assigning fight finishing techniques to fighters would be repeated independently by each of the players in the game. Fighters would remain available to be selected for the rosters of multiple players, even if they had been selected by other players previously.

Once the real-world MMA event begins, players are awarded units of value, such as game points, game currency, game awards, prizes or other value units, each time fighters they have selected for their team win fights "inside the distance," which is to say, prior to a judges' decision. The game provides bonus value units or multiples of value units based upon: the duration of the fight (in inverse proportion to its duration); the tier to which the selected fighter was assigned by the player; and in certain embodiments, the manner in which a given fight ended, provided the player's initial selection of a fighter to win "inside the distance" was correct. In this exemplary embodiment, the fantasy teams would compete based on this single MMA event. At the end of the event, the scoring methodology is applied and a winner is tabulated and declared. In alternative embodiments, game play could be based on two or more separate MMA events.

This and other embodiments of the invention bear several advantages over the prior art. Game providers and statisticians would need to capture, tabulate and report only the winner of each fight, the time in which each fight was won, and the technique by which each fight was won. The rules required to learn the game would be simple and intuitive. The statistics would be reported to the game provider more quickly, more accurately and with less effort than the statistical categories utilized in the prior art. Players would receive updates to their game status quickly, efficiently, and closer to "real time" than the prior art, with game standings able to be recalibrated during and after each fight. The frequency of fighters on player rosters failing to fight due to injury or rescheduling would be reduced from the prior art. The game winners could also be determined based upon a single MMA event.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Reference will now be made in detail to certain embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those having ordinary skill in the art.

Figure 1:
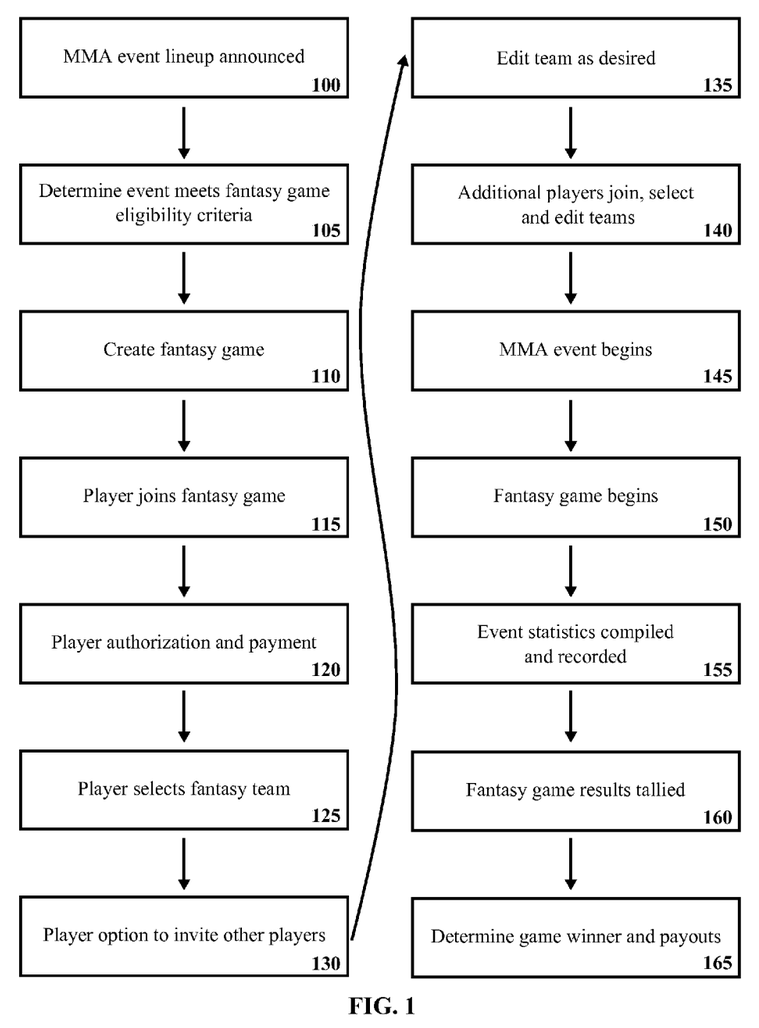
FIG. 1 is a flow chart illustrating the administration and play of a fantasy MMA game according to an embodiment of the invention.

FIG. 1 is a flow chart illustrating the administration and play of a fantasy MMA game according to an embodiment of the invention. As shown in FIG. 1, the opportunity to play a fantasy game is triggered by the announcement of a new real-world MMA event 100. The game provider determines if the event in question meets certain eligibility criteria for inclusion in a fantasy game 105. Eligibility criteria may include whether a sufficient number of bouts have been announced for the event to permit satisfactory game play, or whether the MMA event in question is adequately regulated, adequately organized or adequately publicized.

If and when a game provider determines the MMA event should support fantasy MMA game play, it creates a new instance of the game 110. This will commonly take place via a centralized computer game server accessible by the world wide web, but may also occur through various other electronic and physical forms. A player then joins an instance of the game 115 by registering or by filling an open game slot. In certain embodiments, a player may be required to pass various authorizations to play, such as meeting certain age or residency restrictions, receiving an invitation to the game, or making a required payment 120. Upon meeting any such requirements a player then selects his fantasy MMA team 125. In certain embodiments a player may have the option to invite additional players 130 to join the game; in other embodiments the game may be a single-player game played against a central game server or "the house," or else, may be a multi-player game in which no invitation element is available. A player will then be given an opportunity to edit his game selections one or more times 135. Additional players are permitted to join the game in the event of a multi-player environment 140, and will repeat the process shown in 115 through 135 for each game player.

Once the real-world MMA event begins 145 the fantasy game players and player selections are locked 150. Statisticians compile and record information for each of the fights on the event billing 155 and relay them to the game host to calculate game points, rankings and/or standings 160. At the conclusion of the fights, the game results are finalized and a winner is determined, along with any prizes for first place or other places 165.

Figure 2:
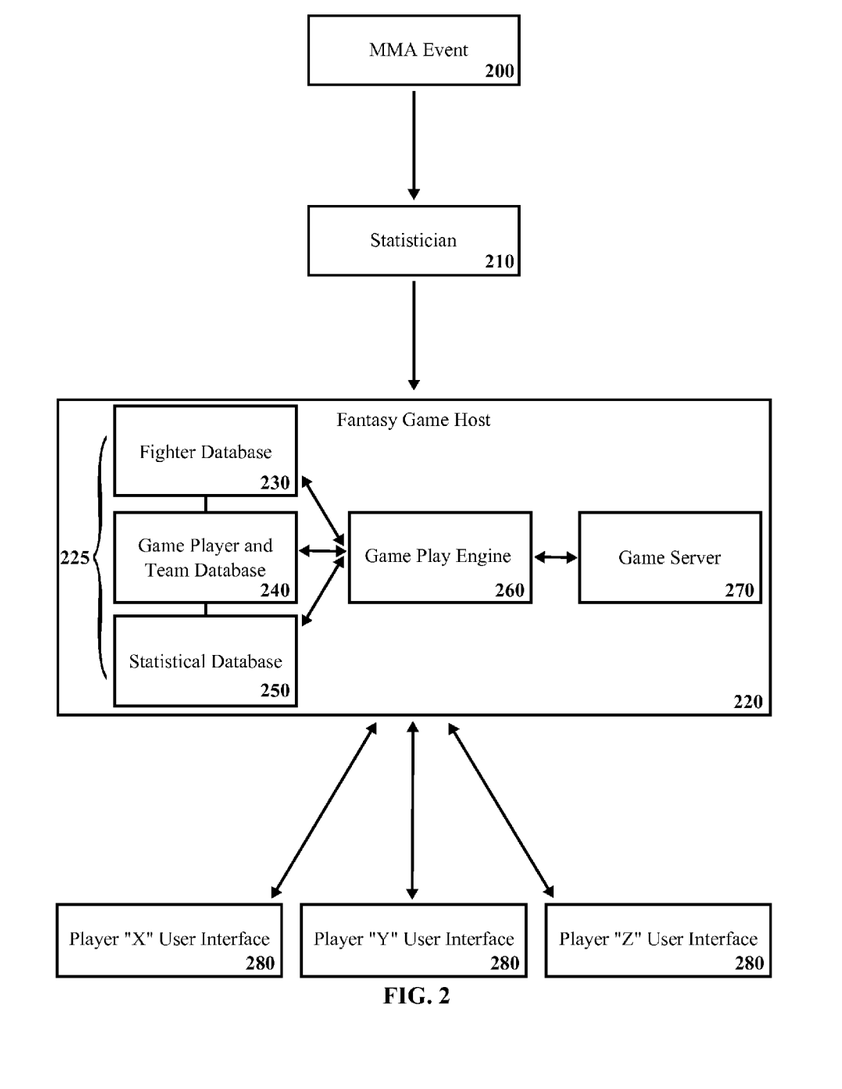
FIG. 2 is a diagram illustrating the sending, receiving and storing of fantasy MMA game-related electronic data in conjunction with game play, according to an embodiment of the invention.

FIG. 2 is a diagram illustrating the sending, receiving and storing of fantasy MMA game-related electronic data in conjunction with game play, according to an embodiment of the invention. As shown in FIG. 2, statistical information is generated by combatants participating in a live MMA event 200. A statistician 210 operates on behalf of a game host to capture, compile and report predetermined statistical data from the MMA event 200 to a game host 220.

The statistical information is delivered to a database structure of one or more databases maintained by the game host which houses electronic information 225. The database structure includes linked databases for the fighters available for game play 230, the fantasy game players and their teams and composition 240, and the statistics captured from the live sporting event and the scoring resulting from game play 250. The game host engine 260 retrieves the statistical information, player and team information, and game scoring information from the database structure 225 and relays it via a game server 270 to each of the user interfaces utilized by game players 280. The user interfaces may be web-enabled computers, mobile phones or other mobile devices, video game consoles, or other devices.

The game players 280 interact with the game host 220 by relaying electronic instructions to the game server 250 concerning their entry in the game, the composition and modification of their fighter roster, and other elements of basic game play. The game server then relays this information to one or more game databases 225 for storage and retrieval.

While an electronic, remote game host dedicated to facilitating game play is one possible embodiment of the invention, in alternative embodiments others are possible, including an electronic message board, chat room or online forum utilized as a repository for the event statistics, or a personal computer used in conjunction with telephone, email or other electronic communication devices. In alternative embodiments game players may also interact with the game database together via a single end terminal, for example, in the event that the players are together in person using a multi-player video game console, an interactive television device, or an electronic kiosk or other device at a live MMA event.

In addition, it will be apparent to one of ordinary skill in the related art that the database structure displayed in the exemplary embodiment shown in FIG. 2 is only one of various means for setting up a satisfactory database design for facilitating game play according to the invention. In alternative embodiments, the linked database structure shown in 225 could be combined into a single database repository for all fantasy game information, or divided into several more databases than the databases shown in 230, 240 and 250, depending on how the relevant game data is organized, divided and deployed in a particular embodiment.

Figure 3:
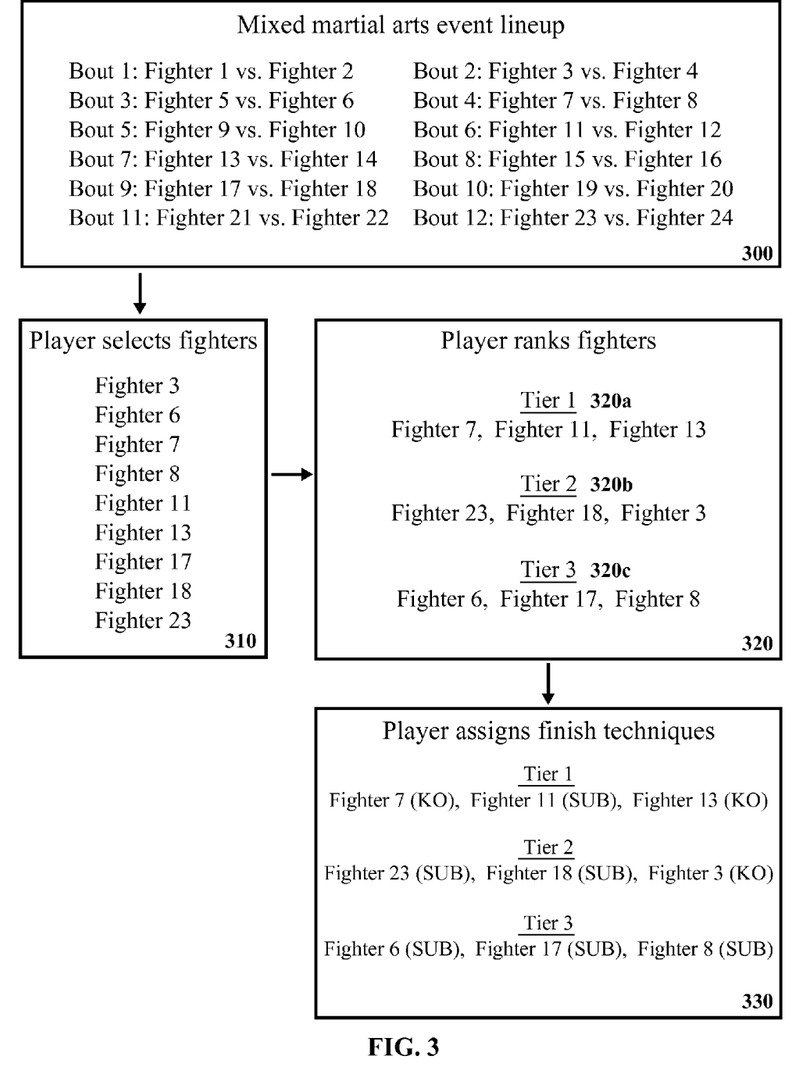
FIG. 3 is a flow chart illustrating a system and method of MMA fantasy game play according to an embodiment of the invention.
Figure 4:
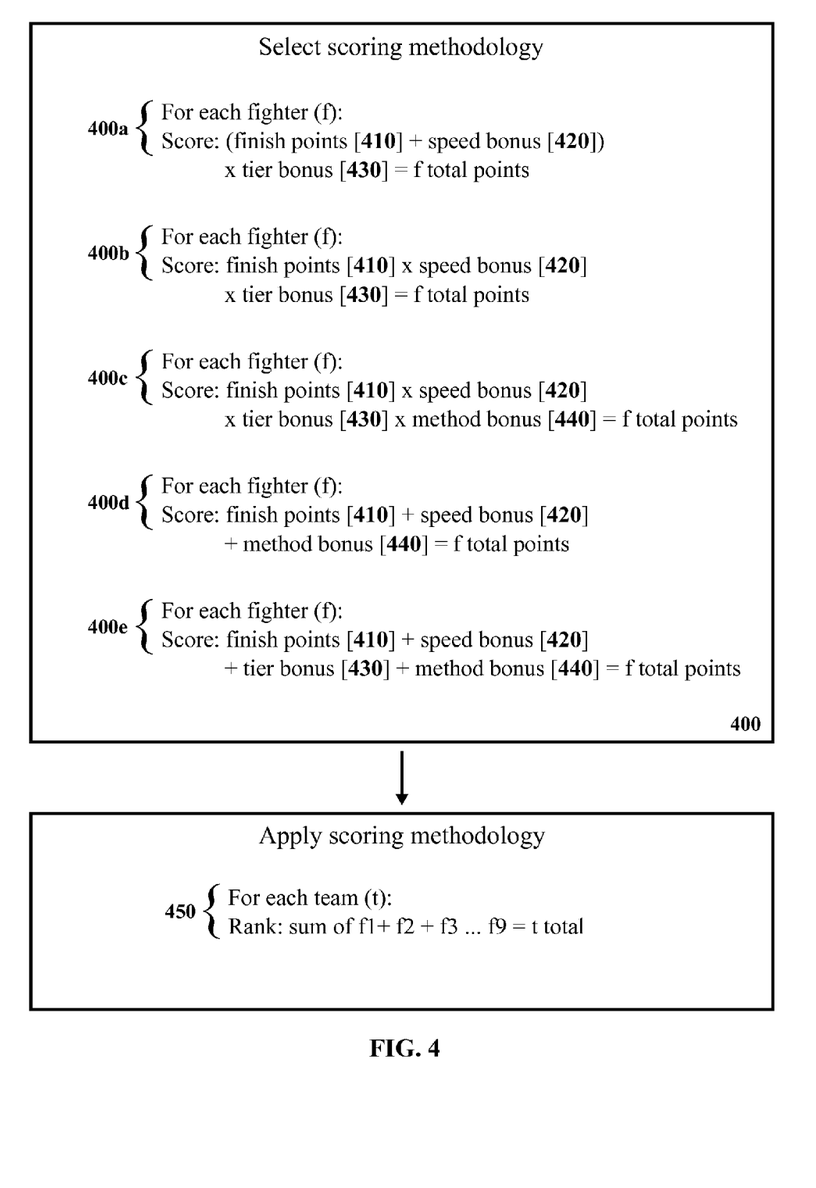
FIG. 4 is a diagram illustrating various available methods of MMA fantasy game scoring according to one or more embodiments of the invention.

FIG. 3 is a flow chart illustrating a system and method of MMA fantasy game play according to an exemplary embodiment of the invention. As shown in FIG. 3, each fantasy game player is presented with a selection of fighters scheduled to participate in an upcoming mixed martial arts event 300. Each game player, separate from each other game player, selects a subset of fighters from the available fighters 310 based upon the game player's judgment that such fighters will win their respective fights the most quickly among the available fights. Either, both, or none of the two fighters in each fight may be selected for a given team. Each game player then ranks his or her selection of fighters into a tiered system 320 which further represents the game player's judgment as to the fighters most likely (Tier 1 320a), second most likely (Tier 2 320b), and third most likely (Tier 3 320c) to win their fights the most quickly. Each game player then assigns the technique by which each of his or her selected fighters will finish their respective fights 330, either via KO or SUB. Each game participant separately follows this process prior to the start of the MMA event. Fantasy game scoring is based upon the accuracy of the player's fighter selection, tier ranking, and technique selection as shown in FIG. 4, discussed below.

In the exemplary embodiment shown in FIG. 3, a single MMA event is shown with a total of twelve announced bouts, with two fighters per bout for a total of twenty four fighters on the fight billing 300. The game player is shown to select nine fighters from the available pool of twenty four 310, and to rank those fighters into three tiers of three fighters per tier 320. The game player is shown to be permitted to select either or both of the combatants who are facing one another in a single bout in order to comprise his or her team 310. The game player is also shown to be permitted to assign KO or SUB as a finish method for each fighter, but not DEC. However, it will be apparent to those skilled in the prior art that various other embodiments of these aspects of the invention are available for variety and/or optimization of game play.

In other embodiments of the invention, the game may be based on multiple MMA events taking place over the course of weeks, months or years. The game rules may permit a player to select as few as four fighters from the available fighter pool, or as many fighters as the entire fighter pool, which itself may be comprised of as few as two bouts (four total fighters) or in some cases as many as twenty five bouts (fifty total fighters) or more. The rules may permit a player to rank fighters into fewer than three tiers according to the fighters' likelihood of finishing their fights the fastest; or into more than three tiers; or to rank each fighter sequentially, from first to last, without the use of a tiered system. The rules may permit a player to include DEC among the available finish methods, in the event a fighter is unable to win his or her fight "inside the distance."

The rules may also permit a player to assign more specific fight finishing techniques to his roster of fighters, including martial arts techniques such as "punch," "kick," "choke" and the like, in place of or in addition to the KO and SUB methods shown in FIG. 3. In another embodiment of the invention, the game rules may dispense with the use of assigning a fight finishing technique entirely, and include only the game player's selection of fighters and his or her ranking of fighters among the scoring criteria.

FIG. 4 is a chart illustrating various available methods of MMA fantasy game scoring according to one or more embodiments of the invention. FIG. 4 illustrates that more than one method is available for scoring an MMA fantasy game based upon embodiments of the invention and that each game instance will utilize a single such scoring methodology. The scoring methodology may be selected either by the game provider or by one or more game participants, according to the embodiment 400. In each such embodiment, game points are allotted based upon the ability of each fighter on a player's roster to finish his or her fight 410; to finish it as quickly as possible 420; and on the fighter's position in a tiered or ranked system 430. In addition, scoring methodologies utilizing a method bonus 440 award further points for correctly selecting a finish via KO, SUB or DEC.

These elements may be combined variously in different embodiments to arrive at the scoring methodology. The methodology is then applied for each fighter (f) on the team of each player. 410 and 420 may be summed and then multiplied by 430 to arrive at total points-per-fighter 400a. Alternatively, 410 and 420 may be multiplied and then multiplied by 430 to arrive at total points-per-fighter 400b. Alternatively, 410 may be multiplied by 420, then the product multiplied by 430, and then the product multiplied by 440 to arrive at total points-per-fighter 400c. Alternatively, 410 and 420 and 430 may be summed to arrive at total points-per-fighter 400d; or 410, 420, 430 and 440 may be summed to arrive at total points-per-fighter 400e. As those familiar with the prior art will recognize, additional possibilities exist for alternative embodiments of the scoring methodology.

With each of these scoring methodologies, the total points-per-fighter are summed for each fighter on a player's roster of fighters to arrive at the total points-per-team 450. The team with the most points wins first place, the team with the second most points wins second place, and so forth.

Figure 5:
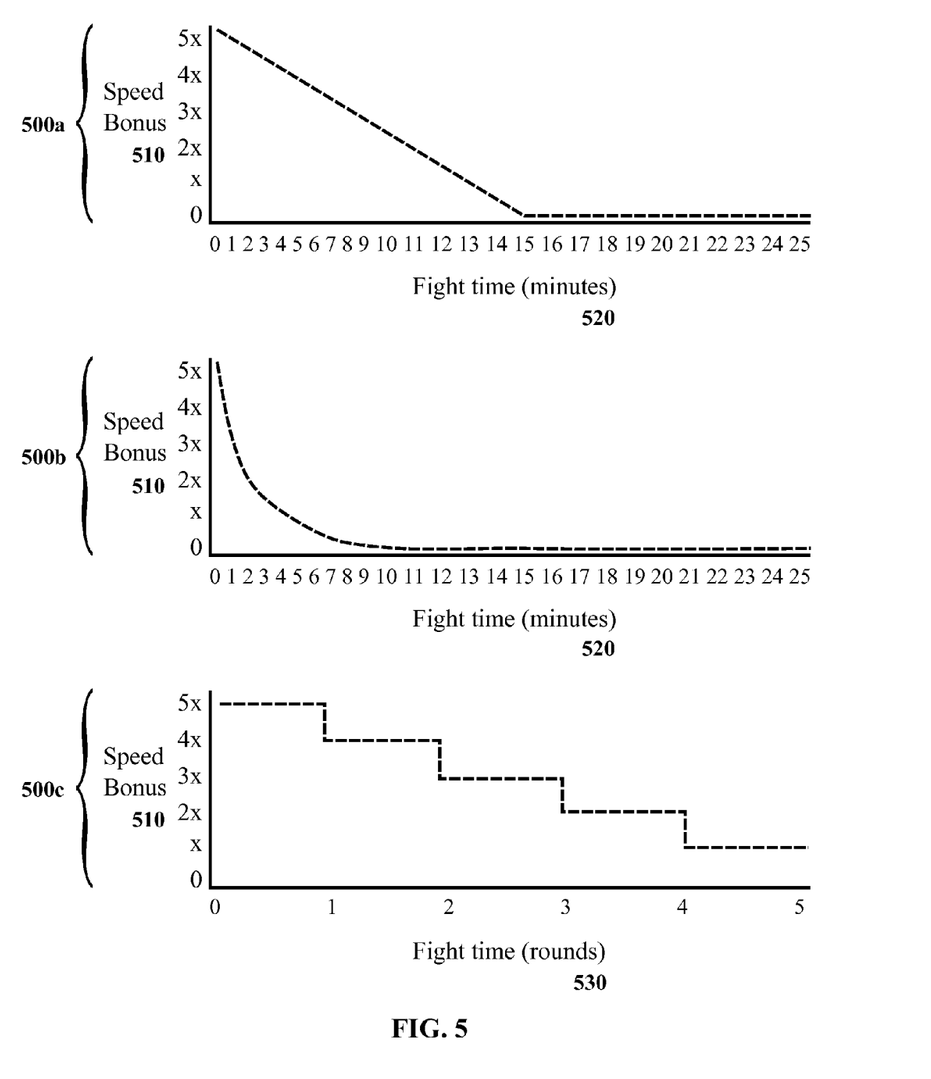
FIG. 5 is a series of graphs illustrating various available numerical methods of awarding MMA fantasy game points as a function of fight duration, according to one or more embodiments of the invention.

FIG. 5 is a series of graphs illustrating some exemplary methods of awarding MMA fantasy game points as a function of fight duration (as referenced more broadly in FIG. 4 at 420), according to one or more embodiments of the invention. For each fighter selected on a given player's team, points are awarded to the team 510 based on how long the fight lasts 520. By offering performance bonuses in game play that decrease as a fight progresses, game players are engaged and entertained in hoping to see fights end as quickly as possible for their roster of fighters. The points may be awarded on a scale that decreases linearly and continuously over the course of the fight 500a. Alternatively, points may be awarded on a scale that decreases continuously according to a function which increases proportionately the value of the quickest fights and decreases proportionately the value of the longest fights, relative to one another 500b. Alternatively, points may be awarded on a scale that decreases discretely in increments based upon each round of action in a fight 500c, or in a similar embodiment, on a scale that decreases discretely in increments based upon the minutes or seconds of a fight. As stated elsewhere, such embodiments are not exhaustive and serve to convey broadly a portion of a range of approaches for awarding game points based upon fight time.

I claim:

1. A method of administering and playing a mixed martial arts fantasy sports game, comprising:
    a. storing a data compilation of mixed martial arts prize fighters in a predetermined database configuration;
    b. allowing one or more players to join said game by means of an electronic user interface;
    c. allowing the players to view a fighter listing comprised of a set of fighters in said data compilation by means of said user interface;
    d. allowing said players to assemble fantasy sports teams by selecting fighters from said fighter listing by means of said user interface;
    e. storing electronic information identifying each of said players and the composition of each of said teams as entered from said user interface in said database configuration;
    f. obtaining statistical information from predetermined statistical categories based on athletic performances in one or more real world mixed martial arts contests, and compiling the information in said database configuration;
    g. applying a predetermined scoring methodology to each of said teams in said game utilizing said statistical information where said methodology is comprised of scoring based on whether or not each fighter that is victorious in a real world mixed martial arts contest is a member of the team, scoring based on whether each fighter that is victorious and a member the team was victorious prior to the conclusion of the time limit of the fight, and scoring based on fight duration for each victorious fighter on the team, where the shorter the fight duration, the greater the scoring value to the team;
    h. providing updated results and standings of said game based upon the application of said methodology to said game, for review by means of said interface.

2. The method as defined in claim 1, wherein said predetermined database configuration consists of a single electronic database.

3. The method as defined in claim 1, wherein said predetermined database configuration consists of multiple electronic databases linked by a hardware system, a software system, a telecommunications system, a distributed computing system, a shared or networked computing system, a "cloud-based" computing system, or a combination thereof.

4. The method as defined in claim 1, wherein said listing is comprised of fighters scheduled to compete or competing in a single real world mixed martial arts contest scheduled to occur or occurring subsequent to or concurrent with said game.

5. The method as defined in claim 1, wherein said listing is comprised of fighters scheduled to compete or competing in multiple real world mixed martial arts contests scheduled to occur or occurring subsequent to or concurrent with said game.

6. The method as defined in claim 1, wherein game play is further comprised of selecting a fighter subset from said fighter listing to comprise said team and dividing the fighter subset into a plurality of groups via said interface, where each such grouping is assigned a different value to be used as a numerical bonus multiple or bonus sum to said scoring methodology.

7. The method as defined in claim 1, wherein game play is further comprised of said players selecting via said user interface a fight finishing technique by which some or all fighters in said fighter listing will be victorious prior to the conclusion of the time limit of the fight, comprised of a knockout technique and a submission technique, and said scoring methodology includes a scoring element based on the accuracy of the selections of said fight finishing technique.

8. The method as defined in claim 1 where game play includes an additional element for the payment or staking of a cost, fee, expense, wager, bet, unit of value or other consideration.

9. The method as defined in claim 1 where a single game player competes against the game provider by means of a predetermined scoring threshold or standard against which the single player is measured.

10. The method as defined in claim 1 where multiple game players compete head-to-head.

11. The method as defined in claim 1 where a plurality of distinct games are maintained and administered simultaneously by a game provider.

12. A system for administering and playing a mixed martial arts fantasy sports game, comprising:
   a. a computer readable database that receives and stores a data compilation of mixed martial arts prize fighters;
   b. an electronic user interface device that allows one or more players to join said game, view a fighter listing comprised of a set of fighters in said data compilation, and assemble fantasy teams by selecting fighters from said fighter listing;
   c. a computer readable database that receives and stores electronic information identifying each of said players and the composition of each of said teams as entered from said user interface;
   d. a computer readable database device that receives and stores statistical information from predetermined statistical categories based on athletic performances in one or more real world mixed martial arts contests;
   e. a computer game engine that applies a predetermined computerized scoring methodology to each of said teams in said game utilizing said statistical information where said methodology is comprised of scoring based on whether or not each fighter that is victorious in a real world mixed martial arts contest is a member of the team, scoring based on whether each fighter that is victorious and a member the team was victorious prior to the conclusion of the time limit of the fight, and scoring based on fight duration for each victorious fighter on the team, where the shorter the fight duration, the greater the scoring value to the team;
   f. an electronic visual user interface device that provides updated results and standings of said game for accessing by means of said interface based upon the application of said methodology to said game.

13. The system defined in claim 12 wherein said user interface is comprised of one or more of all available versions of a web-enabled personal computer, web-enabled mobile device, personal digital assistant, portable electronic gaming device, home video game console, electronic game kiosk, arcade game, or interactive television device.

14. The system defined in claim 12 where either or both of said data compilation and said user interface is comprised of, or the system is otherwise linked with, a pari-mutuel betting machine, fixed-odds betting machine, casino gambling machine, sports book machine array, or machine device enabling or facilitating electronic sports wagering.

* * * * *